United States Patent [19]

Binder et al.

[11] Patent Number: 5,783,324

[45] Date of Patent: Jul. 21, 1998

[54] FUEL CELL INCLUDING A SINGLE SHEET OF A POLYMER ELECTROLYTE MEMBRANE (PEM), THE PEM BEING DIVIDED INTO REGIONS OF VARYING ELECTRICAL AND IONIC CONDUCTIVITY

[75] Inventors: Michael Binder, Brooklyn, N.Y.; Sol Gilman, Rockville, Md.; Robert J. Mammone, South Plainfield, N.J.

[73] Assignee: The United States of America as represented by the Secretary of the Army, Washington, D.C.

[21] Appl. No.: 741,755

[22] Filed: Nov. 5, 1996

Related U.S. Application Data

[63] Continuation of Ser. No. 320,611, Oct. 6, 1994, abandoned.

[51] Int. Cl.[6] ............................................. H01M 8/10
[52] U.S. Cl. .................................. 429/31; 429/33; 429/35
[58] Field of Search ................................ 429/31, 30, 33, 429/35

[56] References Cited

U.S. PATENT DOCUMENTS 5,190,834  3/1993  Kendall .
5,609,795  3/1997  Matsumoto et al. .

Primary Examiner—John S. Maples
Attorney, Agent, or Firm—Michael Zelenka; George B. Tereschuk

[57] ABSTRACT

A fuel cell is provided including a single sheet film or ribbon of any length of a Polymer Electrolyte Membrane ("PEM") wherein the PEM is divided into regions or zones of varying electrical conductivity and ionic conductivity, allowing the elimination of endplates and/or a bipolar configuration. In this non bipolar arrangement, means are provided for distributing fuel to only one side of the PEM and oxidant to only the other side of the PEM so as to prevent mixing of the fuel and oxidant.

3 Claims, 2 Drawing Sheets

FUEL CELL INCLUDING A SINGLE SHEET
OF A POLYMER ELECTROLYTE
MEMBRANE (PEM), THE PEM BEING
DIVIDED INTO REGIONS OF VARYING
ELECTRICAL AND IONIC CONDUCTIVITY

CONTINUATION

This application is a continuation of United States Patent and Trademark Office application Ser. No. 08/320,611, entitled, "Fuel Cell Including a Single Sheet of a Polymer Electrolyte Membrane ("PEM"), the PEM Being Divided into Regions of Varying Electrical and Ionic Conductivity," filed on Oct. 6, 1994, by the same inventors herein, and now abandoned. This continuation is being filed under 35 USC §120 and 37 CFR §1.53.

GOVERNMENT INTEREST

The invention described herein may be manufactured, used, and licensed by or for the Government for governmental purposes without the payment to us of any royalty thereon.

FIELD OF INVENTION

The invention relates in general to fuel cells and in particular, to fuel cells including a single sheet of a polymer electrolyte membrane ("PEM") wherein the PEM is divided into regions of varying electrical and ionic conductivity.

BACKGROUND OF THE INVENTION

Fuel cell power systems are bound to be one of the more important future alternative power sources and energy conversion devices for portable power packs since they are lightweight and have low noise and thermal signatures. Fuel cells are readily adapted for various applications since unlike other electrochemical sources, which can operate on only one type of fuel, fuel cells may be operated with a number of different fuels. By silently converting chemical energy of various fuels directly into electricity, water, and heat, fuel cells provide clean, nonpolluting energy, with only water and heat as byproducts. For electric vehicles, manportable power systems or remote power systems where lightweight fuel cells are required, there has been significant and renewed interest in developing fuel cells using polymer electrolyte membranes, PEMs. Here, a thin PEM simultaneously acts as (a) the proton conducting electrolyte; (b) separator which prevents the air or oxygen on the cathode side from contacting the hydrogen or other fuel at the anode and (c) catalyst support. Use of a single, thin PEM instead of an electrolyte made of either aqueous solutions, molten salts or solid oxides liberates this type of fuel cell technology from the storage and maintenance problems facing corrosive and/or high temperature electrolytes. PEM based fuel cells are extremely attractive because all components are solid, noncorrosive, and operational temperatures are generally below 100° C.

Fuel cells using PEMs are expected to have long shelf life on open circuit stand and should be capable of starting up and operating at relatively low temperatures (<100° C.) since PEMs do not require higher temperatures to achieve good ionic conductivity. Polymer based proton conductors provide both the medium for bulk proton transport and the interfacial environment for the fuel oxidation and reduction reactions.

Typical PEMs, approximately 50–200 micron thick, are based on polymers that have PTFE-like backbones and that have fluorocarbon-based sulfonic acid side chains ($-CF_2-SO_3H$) covalently attached as pendant groups. The acidic sulfonic acid terminal group, $-SO_3$, is highly ionized in water, with the proton being the mobile replaceable ion, while the sulfonate group is fixed in the polymeric matrix. These $SO_3H$ groups provide cation exchange capacity and ionic conduction for typical PEMs such as Dupont's Nafion series, Dow's lower molecular weight analog (XUS), Membrane C by Chlorine Engineers, Japan, and Aciplex S membrane from Asahi Chemical Industry Company Ltd. of Japan.

Since fuel cells using hydrogen, methanol, or other liquid fuels generally provide operating voltages below 1.0 volt, and since practical fuel cells must usually provide from at least several volts up to 100 volts or more, the usual approach is to construct many separate pairs of cells in a multicell fuel cell stack using a bipolar design. In this design, a number of individual cells (each cell having its own PEM) are electronically connected in series by abutting the anode current collector of one cell with the cathode current collector of its nearest neighbor in the stack. Each individual cell generally includes an anode, a cathode, a common electrolyte (PEM) and a fuel and oxidant source. Both fuel and oxidant are introduced through manifolds to their respective chambers. The dilemma with sealing and manifolding this piled or layered design is that individual cells each with its own PEM must be necessarily held together with a clamping frame and tie endplates. PEM fuel cell stacks must also include the required gas diffusers that are usually interspersed between active single cells each containing its own discrete PEM. These gas diffusers provide only limited transport of oxygen (either pure oxygen or by using air). Increasing gas transport requires either pressurization of air or forced convection. In addition, since in order for a fuel cell to operate, hydrogen gas (fuel) and oxygen gas must each be kept to its own side of each membrane, appropriate hydrogen and oxygen delivery systems are used to feed the proper gas to the correct side of each individual cell and each membrane. All of this adds bulk, weight, cost and complexity to the stack. This design also suffers from heat management problems since cells within the bipolar arrangement, i.e. those far from the stack ends, are not sufficiently cooled by either air or the coolant.

An alternate configuration would be a side by side series connection in which a number of individual cells each with its own discrete PEM sheet or film are placed next to each other in a horizontal, planar, or wound configuration. This arrangement eliminates the bulky tie rods, and connectors, and minimizes heat transfer problems since the cells are connected together in a side by side arrangement. However, in order to connect the individual cells with their discrete PEM in series (in such a manner that the cathode of cell 1 is connected with the anode of cell 2), an electronic conductor must pass through the plane of the attached cells and connect to adjacent cells. An example of this is U.S. Pat. No. 5,190,834, by Kendall that discloses and claims a composite membrane comprising a domain of conductive and another domain of electrically insulating materials connected by a feedthrough that traverses the plane of the membrane and connects from the bottom of one cell to the top of the adjacent cell. The major flaw in the Kendall design is that it requires an insulating elastomer or other type of material to separate each individual cell from its nearest neighbor. This arrangement is not satisfactory in the case of fuel cells, since this adhesive bond between PEM cells would not be impermeable to hydrogen gas, methanol or other fuel, over the life of the cell. Furthermore, the adhesive connector would be unable to allow for expansion and contraction of individual cells (since the PEM expands and contracts) as a function of temperature and water content. In addition, since there is an adhesive or connector between cells, the Kendall cell assembly is not completely sealed and the assembly process for sealing cells together is labor intensive.

SUMMARY OF THE INVENTION

The general object of this invention is to provide a design for a fuel cell that consumes gaseous or liquid fuels that will overcome the aforementioned difficulties. A more particular object of the invention is to provide a novel nonbipolar design for a fuel cell, capacitor or sensor that eliminates the conventional bipolar design by changing to a side by side series configuration of individual PEM cells fabricated from a single uncut sheet, film or roll of PEM. A particular object of the invention is to provide a design for a fuel cell that utilizes a single sheet or ribbon of PEM that is subdivided chemically into zones or regions so that a number of individual cells can be made from a single sheet or ribbon of PEM. This differs from ideas where electrodes are embedded in a matrix for here the PEM itself acts as the matrix or support.

It has now been found that the aforementioned objects can be attained by providing a single sheet of PEM of any length that is subdivided into regions, zones bands or sections of varying electrical and ionic conductivity and a means for distributing fuel to one side of this PEM and oxidant to the other side of this PEM in such a manner as to prevent mixing of the fuel and the oxidant. In this invention, the zones or regions are not taped or glued together but rather are made from the same PEM. In this way the problems with sealing the joints between the different regions is alleviated.

DETAILED DESCRIPTION OF THE DRAWINGS AND THE PREFERRED EMBODIMENT

Figure 1:
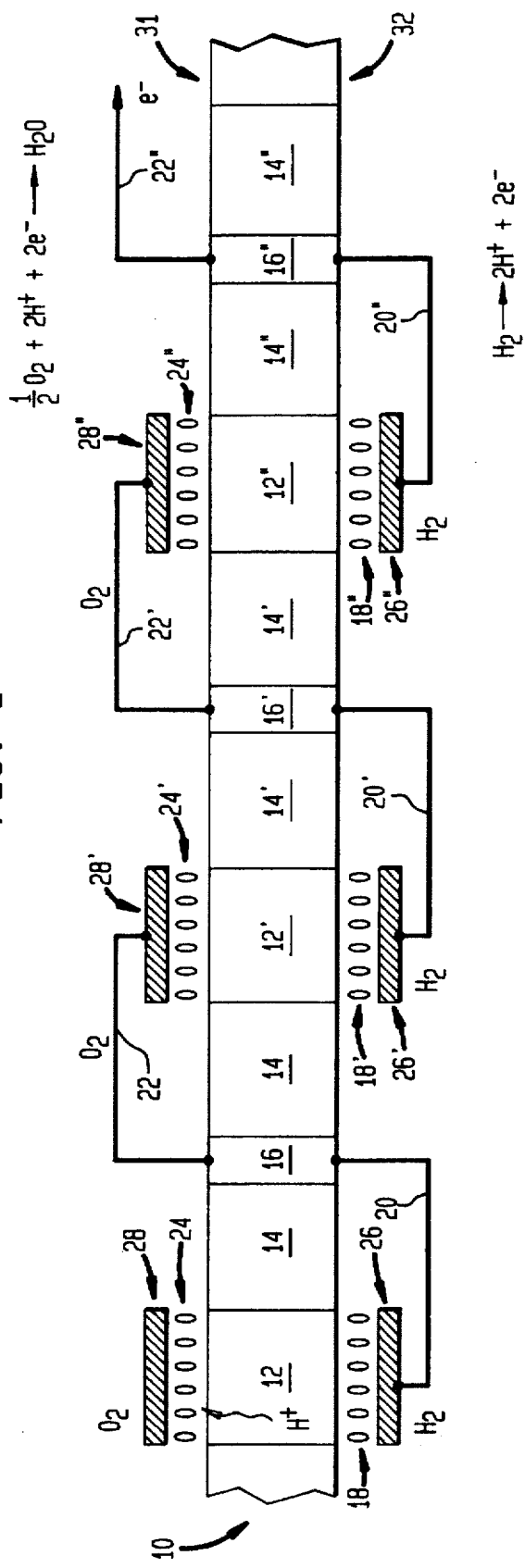
FIG. 1 is a schematic view of a side by side series configuration of individual PEM cells made from a single sheet of PEM according to the invention.

Referring now to FIG. 1, a single sheet of PEM 10, that can be solution cast or melt extruded is deliberately separated and divided into regions, zones or bands, which could include a plurality of regions which can be made, in varying degrees, to be conductive or non-conductive so that conductivity is either enhanced or diminished, that traverse the membrane thickness, having the designation and repeat pattern of 12, 14, 16, 14–12', 14', 16'–14'–12", 14", 16", 14" where the ' or " refers to a repeat of the pattern, which may also be referred to as an ABC-ABC-ABC repeat pattern. Each of said plurality of regions of varying electrical and ionic conductivity having varying electrical and ionic properties, further comprising electrical conductivity, ionic conductivity, electrical non-conductivity and ionic non-conductivity.

In FIG. 1, regions 12, 12' and 12" are taken to represent a plurality of regions of PEM, being an "A", or first, region in the repeat pattern ABC-ABC-ABC, that are ionically conducting but electrically nonconductive. This is characteristic of untreated PEM. Regions 14, 14', and 14" are taken to represent a plurality of regions, being a "B", or second, or middle separation, region in the repeat pattern ABC-ABC-ABC, having sufficiently low ionic conductivity so that hydrogen ions, commonly called protons, cannot travel diagonally across said first region to said second region and a plurality of like regions 12, 12', and 12" have little or no electrical conductivity. Regions 14, 14' and 14" may also be designed to be wide enough to deter hydrogen ions from travelling diagonally across said first region to said second region, in lieu of having a given level of ionic conductivity. This region or zone acts as the electrical spacer. Regions 16, 16', and 16", being a "C" region in the repeat pattern ABC-ABC-ABC, is deliberately made on said PEM sheet 10 to be sufficiently electrically conductive to allow ease of electron transfer from the anode side of region 12 to the cathode side of region 12', or from one cell to the next cell.

All of these regions i.e., 12, 14 and 16, traverse the thickness of the membrane. This repeat pattern can be designed into a single, continuous sheet of any length of PEM by processing the membrane so that different sections of the PEM have different electrical properties. Regions 12, 12', and 12" are the untreated, as formed, regions of the PEM. Regions 14, 14', and 14" are regions that are deliberately made to be both Ionically nonconducting and electrically insulating. Regions 14, 14' and 14", that electrically isolate regions 12, 12' or 12" from 16, 16', or 16", respectively, can be created subsequently to film formation for example, either by chemically modifying the PEM to reduce its ionic conductivity, or by exposing the desired regions of the PEM to a $CF_4$ gas plasma that substantially reduces the ionic conductivity in this region of the PEM. Regions 16, 16', and 16" can be created in the PEM by blending or mixing the PEM with conductive polymers, or by irradiating it with ion beams to implant species that will increase the electrical conductivity.

The fuel cell of the present invention is sealed along an upper edge 31 and a lower edge 32 of the PEM 10 to prevent gases or liquids from mixing with each other so that the fuel, either hydrogen or any other suitable fuel, comes in contact with one side while the oxidant, oxygen, only comes in contact with the other side of the PEM. The means for distributing a fuel to only one side of said PEM sheet and distributing an oxidant only to the other side of said PEM sheet must prevent mixing of said fuel and said oxidant.

Figure 2:
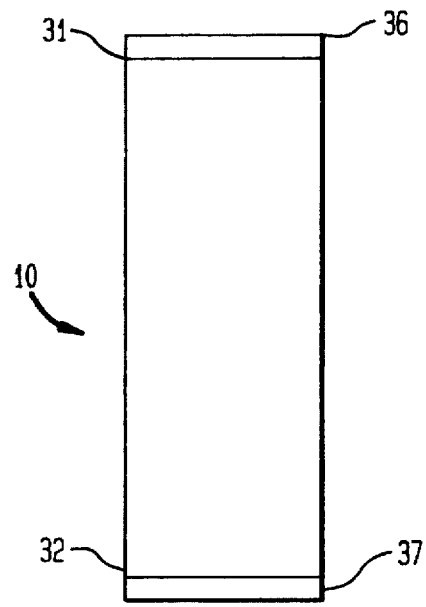
FIG. 2 is a side view which depicts the PEM being sealed.

FIG. 2 illustrates a side view of the PEM 10 being sealed. Referring now to FIG. 2, a seal 36 seals said upper edge 31 of the PEM 10. Similarly, a seal 37 seals said lower edge 32 of the PEM 10.

In the foregoing embodiment one could also conceivably start with a PEM or other material that is completely insulating as for example, in regions 14, 14' and 14". By selectively and deliberately altering the PEM so that certain desired regions will have characteristics of regions 12, 12' and 12 i.e., ionically conducting and electrically insulating and regions 16, 16' and 16" (electrically conducting) the same effects can be achieved.

The fuel and oxidant can now be easily distributed by sealing along the edge or periphery of the PEM so that the fuel comes in contact with only one side while the oxidant only comes in contact with the other side of the PEM. A solid DC-DC converter can be used to raise the stack voltage to a desired system output voltage.

More particularly, according to the invention, in an operational fuel cell using this design, hydrogen gas enters on the anode side of the PEM 10, and passes through gas diffusion electrodes 26, 26' and 26" that are in contact with the anode catalyst 18, 18' or 18". The hydrogen then comes in contact with anode catalyst 18, 18' and 18" and is dissociated into protons and electrons according to the equation:

$$H_2 \rightarrow 2H^+ + 2e^-$$

The formed protons then travel through the PEM regions (12, 12' or 12") towards the cathode side. Electrons, formed by the anode reaction above, travel through the electrical connectors 20, 20' and 20" that are attached to the gas diffusion electrode 26, 26' and 26", travel through conductive zones 16, 16' or 16" in the PEM sheet 10, and pass through the electrical connectors 22, 22' and 22" on the cathode side, to the gas diffusion electrodes on the cathode side 28, 28' and 28". On the cathode side, oxygen gas passes through the gas diffusion layer 28, 28' and 28" and is electrochemically reduced on the cathode catalyst 24, 24' and 24" to water by the reaction:

$$2e^- + \tfrac{1}{2}O_2 + 2H^+ \rightarrow H_2O$$

Figure 3:
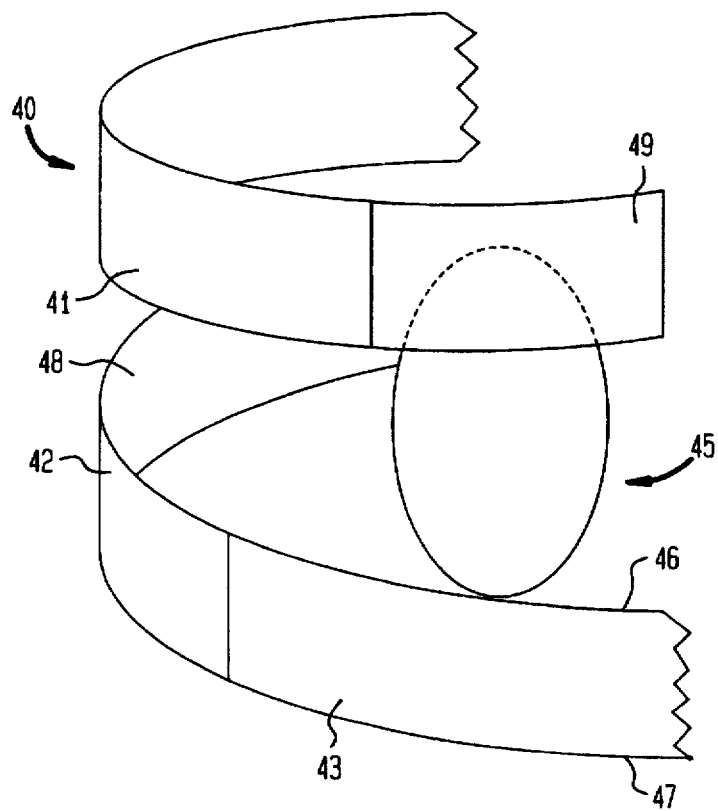
FIG. 3 depicts an alternate configuration of the present invention by having the PEM in a winding or ribbon configuration.

Improved construction and cell arrangement can be made for electrochemical devices such as batteries, fuel cells, sensors or the like where a PEM is comprised of alternating regions that are ionically conductive and electrically insulating, regions that are both tonically and electrically insulating, and finally, regions that are electrically conducting. Referring now to FIG. 3, the entire PEM sheet 40 assembly can be wound in a ribbon type configuration around a central core 45 where a gas or liquid contacts an interior side 48 of said PEM sheet 40 contiguous with said central core 45 and another gas or liquid contacts an exterior side 49 of said PEM sheet 40.

FIG. 3 depicts the ribbon-winding configuration of the present invention showing said PEM sheet 40, or a plurality of similar PEM sheets, being wound around said central core 45, said PEM sheet 40 having a plurality of regions including a first region of PEM 41 being ionically conducting but electrically insulating, a second region of PEM 42 having very poor protonic conductivity and little electrical conductivity, and a third region 43 being highly electrically conductive. Said PEM sheet 40 having an upper edge 46 and a lower edge 47. The PEM membranes are sealed at the upper and lower edges, 46 and 47, respectively, to prevent gases or liquids from mixing with each other. While FIG. 3 depicts a spiral type of winding configuration, the present invention also encompasses other winding or ribbon-type configurations.

We wish it to be understood that we do not desire to be limited to the exact details of construction shown and described for obvious modification will occur to a person skilled in the art.

What is claimed is:

1. A fuel cell including a single sheet of polymer electrolyte membrane (PEM), comprising:

said PEM sheet being divided by chemical treatments into a plurality of regions;

each of said plurality of regions having varying electrical and ionic conductivity properties further comprising electrical conductivity, ionic conductivity, electrical non-conductivity, ionic non-conductivity and combinations thereof;

said PEM sheet having a means for distributing a fuel to only one side of said PEM sheet and distributing an oxidant only to the other side of said PEM sheet in such manner as to prevent mixing of said fuel and said oxidant;

said plurality of regions of the PEM sheet are further divided into at least three regions with a designation and repeat pattern of ABC-ABC-ABC;

said A region of the plurality of regions being ionically conductive but electrically non-conductive;

said C region of the plurality of regions being electrically conductive but ionically non-conductive and said B region of the plurality of regions having ionic conductivity lower than said A region, and having electrical conductivity lower than said C region.

2. A fuel cell, as recited in claim 1, wherein said means for distributing said fuel to the one side of said PEM sheet and distributing said oxidant to the other side of said PEM sheet prevents mixing of said fuel and said oxidant by sealing said PEM sheet along an upper edge and a lower edge of said PEM sheet so that said fuel only comes in contact with the one side of said PEM sheet while said oxidant only comes in contact with the other side of said PEM sheet.

3. A fuel cell, as recited in claim 1, comprising:

a plurality of PEM sheets in a side by side series configuration being wound around a central core; and each of said plurality of PEM sheets having an upper edge, a lower edge, an interior side contiguous to said central core and an exterior side.

* * * * *